June 27, 1933.  J. E. COVEY  1,915,294
CLAMP COMB HANGER
Filed Oct. 5, 1931
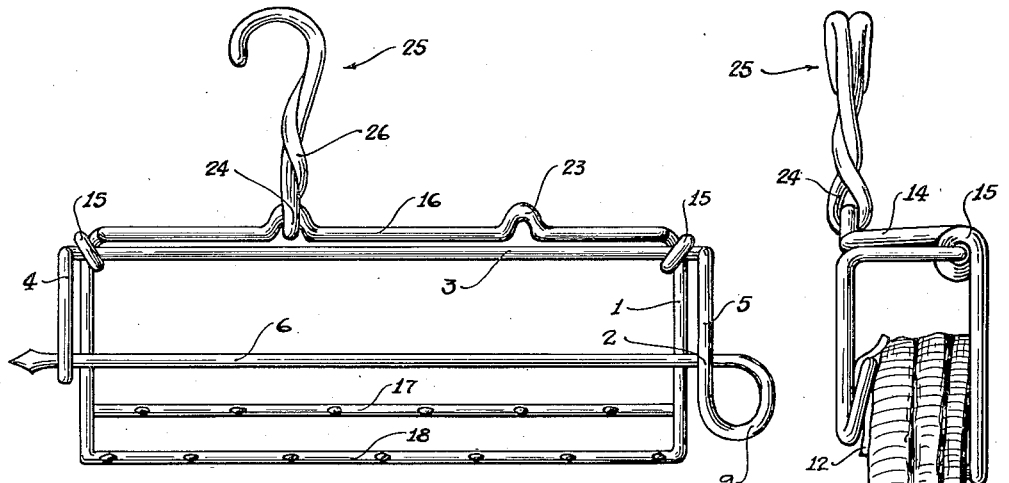
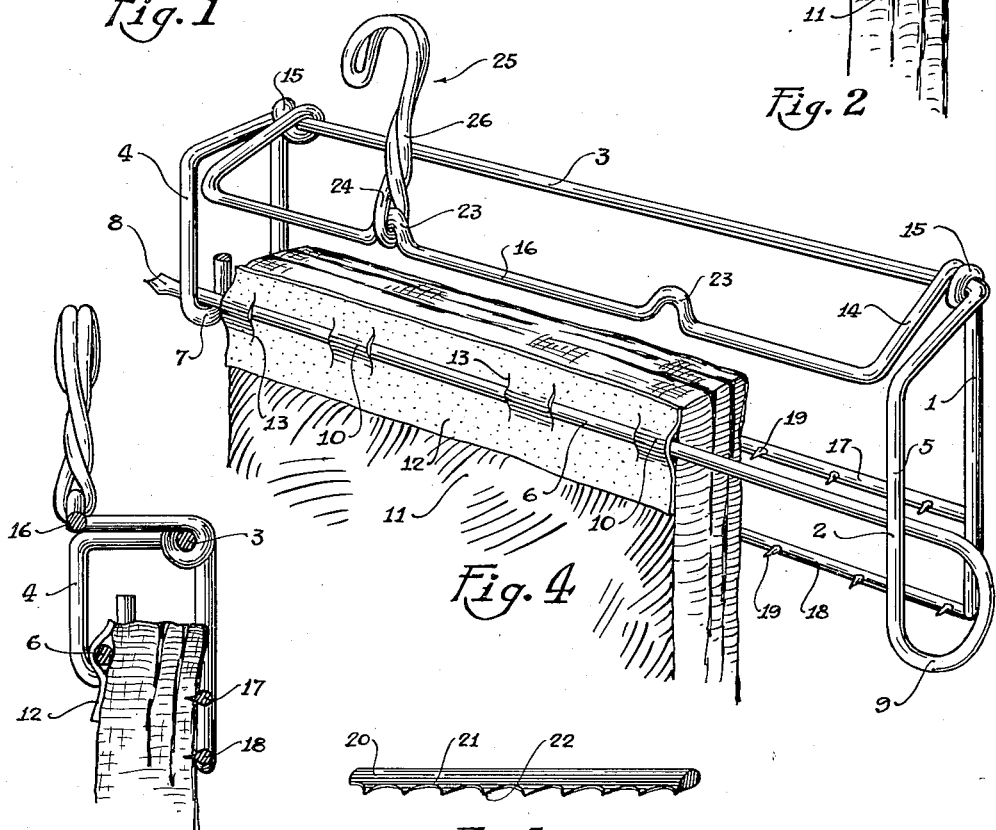
John E. Covey
INVENTOR Patented June 27, 1933

1,915,294

UNITED STATES PATENT OFFICE

JOHN E. COVEY, OF CHICAGO, ILLINOIS, ASSIGNOR TO SWIFT AND COMPANY, OF CHICAGO, ILLINOIS, A CORPORATION OF ILLINOIS

CLAMP COMB HANGER

Application filed October 5, 1931. Serial No. 566,957.

The invention relates to a comb clamp hanger.

The object of the present invention is to provide a simple, practical and efficient comb clamp hanger of the skewer type equipped with a hanging lever clamp or clamping lever extending from the upper end of the lean side of the belly or bacon slab, whereby the weight of the meat when attached to the hanger will draw the clamping lever into position and cause the clamping lever to act as a support to the fat and lean meat which would otherwise sag down out of position during the process of smoking.

A further object of the invention is to provide a clamp comb hanger having an adjustable hanging attachment for making contact with smoke house trolley frames adapted to enable either a right or left belly to be effectively hung in the hanger in an off center position above the so-called belly side and more near the back side, whereby a square shape is insured. There are a back side and a belly side to each piece of bacon. The contraction of the belly side in smoking is greater than that of the back side and hence the advantage of hanging the bacon slightly off center to insure the square shape.

It is also an object of the invention to provide a comb clamp hanger having a clamping lever adapted as the belly shrinks to follow the same and hold the upper end of the face of the belly in proper position at all times.

It is a further object of the invention to provide a clamp comb hanger equipped with a clamping lever or clamp provided with a jaw having relatively small meat engaging teeth adapted to securely grip the belly or bacon slab at the lean side thereof without liability of mutilating the meat.

With these and other objects in view, the invention consists in the construction and novel combination and arrangement of parts hereinafter described, illustrated in the accompanying drawing, and set forth in the claims hereto appended, it being understood that various changes in the form, proportion, and minor details of construction, within the scope of the claims, may be resorted to without departing from the spirit of the invention or sacrificing any of the advantages thereof.

In the drawing:

Figure 1 is a front elevation of a clamp comb hanger constructed in accordance with the present invention.

Fig. 2 is an end elevation of the same, showing the hanger applied to a slab of bacon.

Fig. 3 is a vertical sectional view through the hanger in substantially the plane of the shank of the supporting hook, the hanger being applied to a slab of bacon similar to that illustrated in Fig. 2 of the drawing.

Fig. 4 is a perspective view of a clamp comb hanger applied to a slab of bacon.

Fig. 5 is a detail view showing another form of teeth, and the meat engaging rods of the clamping jaw of the lever.

In the accompanying drawing, in which is illustrated the preferred embodiment of the invention, the comb clamp hanger comprises in its construction a meat clamping lever 1 and a skewer frame 2 on which the meat clamping lever is fulcrumed. The skewer frame, which is constructed of heavy wire or other suitable material, is composed of a horizontal fulcrum 3, approximately inverted L-shaped sides 4 and 5, and a skewer 6. The wire is bent intermediate of its ends at spaced points to form the fulcrum 3, and is extended forwardly from the ends thereof and bent at each end of the fulcrum at substantially right angles to form the approximately inverted L-shaped sides 4 and 5. The sides 4 and 5 have upper approximately horizontal portions and depending approximately vertical front portions, and the lower terminal of the depending portion of the side 4 is bent rearwardly and upwardly to form an approximately U-shaped keeper 7 which is engaged by the pointed free end 8 of the skewer 6.

The wire at the lower end of the depending portion of the other inverted L-shaped side 5 is bent or partially coiled to form the spring 9, and is extended therefrom across the clamp comb hanger to form the said skewer, which is preferably laced through vertical ribbon-like portions 10 of the skin of a belly or slab 11 of bacon. It is preferable to remove the skin from the slab of bacon except for a narrow strip 12 through which the skewer passes, at one end of the slab, as clearly illustrated in Fig. 4, and the ribbon-like portions are formed by cuts 13 located at the inner portions of the strips 12. While it is preferable to lace the skewer through the ribbons 10 of skin, so that only a minimum amount of the skewer will come in contact with the edible portion of the slab, the skewer may, of course, be passed through the hard fat at the inner face of the strip 12 of skin.

The resiliency of the spring loop 9 will hold the free pointed end of the skewer in the keeper 7, which is open at the top, and the weight of the meat will maintain the skewer in engagement with the keeper, the skewer frame and the skewer forming a safety skewer feature of the hanger.

The clamping lever 1, which is also constructed of heavy wire or other suitable material, is composed of approximately inverted L-shaped sides 14 provided at their angles with eyes 15 to receive the fulcrum rod 3 and having approximately horizontal forwardly extending upper arms and approximately vertical depending rear arms, the upper arms 14 being connected by a hanger or suspension rod 16 and the rear depending arms being connected at their lower portions by approximately horizontal meat engaging rods 17 and 18. The wire of the clamping lever is bent at right angles at spaced points to form the hanger or suspension rod 16, and the said approximately inverted L-shaped sides 14, and it is coiled at the angles of the L-shaped sides to provide the bearing eyes 15 through which the fulcrum rod 3 passes.

One or more of the horizontal meat engaging rods 17 and 18 may, of course, be employed, and the latter are preferably welded at their terminals to the depending arms of the sides of the clamping lever. The meat engaging rods form a meat clamping jaw which may, of course, be of any other desired construction, and the said rods 17 and 18 are preferably provided at intervals with short spurs 19 forming teeth for engaging the lean side of the belly or slab of bacon. Instead, however, of providing teeth in the form of spaced approximately pyramidal or conical spurs, the teeth may consist of a corrugated flange 20, as illustrated in Fig. 5 of the drawing. The flange 20 is formed by approximately segmental scallops or recesses 21 which provide the intervening projecting portions or teeth 22. The clamps may be formed on the meat engaging rod in any desired manner, as will be readily understood. The teeth 19 of the rods 17 and 18 are preferably staggered, as clearly illustrated in Fig. 1 of the drawing, but they may be arranged in any other desired manner and any number of the meat engaging teeth may be employed.

The hanger or suspension rod which connects the front or outer ends of the horizontal arms of the inverted L-shaped sides of the clamping frame is provided at spaced points with upwardly extended bends 23 located at opposite sides of the center of the rod 16 and adapted to receive loops or eyes 24 of a supporting hook 25. The supporting hook 25, which is preferably constructed of stout wire, is composed of two sides twisted together at the shank 26 and forming the loop 24 at the lower end of the twisted shank. By providing the bends 23 at opposite sides of the center of the suspension portion of the hanger, the supporting hook may be arranged at either side of the center of the hanger for supporting a belly or slab of bacon off center, and the two-way arrangement of the supporting means enables a right or left belly to be properly suspended in the hanger. While the bends 23 are shown at opposite sides of the center, a central bend may, of course, be provided, and the bends may be arranged at any other desired points to afford the required adjustment of the supporting device.

The L-shaped sides of the clamping lever by being fulcrumed at their angle on the rod 3 form an angle lever having an approximately horizontal forwardly extending arm to which the suspending means is applied, and a depending approximately vertical arm which carries the meat engaging jaw. As clearly illustrated in Fig. 3 of the drawing, the pivotal connection between the skewer frame and the clamping lever provides a meat clamp, the skewer frame constituting one member of the clamp and the depending arm and jaw of the lever constituting the other member of the clamp. When the hanger is applied to the meat and subjected to the weight thereof, the weight of the meat will draw the clamping lever into proper clamping position, and will maintain a positive clamping action on the meat as long as the same is suspended in the hanger, and as the meat shrinks the clamp will properly adjust itself to the meat so that the upper end of the slab or belly will always be held in proper position. This skewer constitutes a straightening rod or form and the clamping jaw will maintain the meat against the said skewer or form and prevent distortion of the meat during curing or processing.

What is claimed is:

1. A clamp hanger comprising a skewer frame having spaced sides and a connecting fulcrum rod, said skewer frame being also provided with a skewer extending from one side of the frame to the other and adapted to engage the skin of a slab of bacon, and a clamping lever having spaced sides fulcrumed at an intermediate point to the skewer frame by the fulcrum rod to provide a meat clamping arm and a hanger arm, said meat clamping arm being provided with spaced rods and forming a meat clamping jaw to cooperate with the skewer and clamp the meat to the same.

2. A clamp hanger of the class described including a skewer frame comprising an approximately horizontal fulcrum rod, spaced sides extending forwardly and downwardly from the fulcrum rod, one of the spaced sides being provided with a keeper and a skewer extending from the other side of the skewer frame and having a free end arranged in the keeper, and a clamping lever composed of substantially L-shaped sides fulcrumed at their angle on the fulcrum bar to form approximately horizontal and vertical portions, meat engaging rods connecting the vertical portions of the sides of the clamping lever, and a suspension rod connecting the horizontal portions of the sides of the clamping lever, said suspension rod being provided with a plurality of bends, and a supporting device slidably mounted on said suspension rod and having an eye adapted to be arranged in any one of the said bends.

Signed at Chicago, in the county of Cook and State of Illinois, this 28th day of September, 1931.

JOHN E. COVEY.